(12) United States Patent
Cerqueira et al.

(10) Patent No.: US 9,995,848 B2
(45) Date of Patent: Jun. 12, 2018

(54) ADAPTIVE PLACEMENT OF WEATHER SENSORS IN RESPONSE TO DYNAMIC LOCAL CONDITIONS

(71) Applicant: INTERNATIONAL BUSINESS MACHINES CORPORATION, Armonk, NY (US)

(72) Inventors: Renato Fontoura de Gusmao Cerqueira, Rio de Janeiro (BR); Kiran Mantripragada, Markham (CA); Igor Cerqueira Oliveira, Rio de Janeiro (BR); Marcelo Nery dos Santos, Rio de Janeiro (BR); Vinícius Costa Villas Boas Segura, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 14/855,759

(22) Filed: Sep. 16, 2015

(65) Prior Publication Data
US 2017/0075033 A1     Mar. 16, 2017

(51) Int. Cl.
*G01W 1/00* (2006.01)
*G01W 1/10* (2006.01)
*G01W 1/02* (2006.01)

(52) U.S. Cl.
CPC .............. *G01W 1/10* (2013.01); *G01W 1/02* (2013.01)

(58) Field of Classification Search
CPC .......... G01V 1/166; G01V 1/168; G01V 1/24; G01V 1/3808; G01V 1/3826; G01W 1/00; G03G 15/1615; G03G 15/50; G03G 21/00; G05B 19/042; G05B 19/4099; G05B 2219/24215; G05B 2219/35134; G05B 2219/49007
See application file for complete search history.

(56) References Cited

U.S. PATENT DOCUMENTS

| | | |
|---|---|---|
| 7,181,345 B2 | 2/2007 | Rosenfeld et al. |
| 8,854,219 B2 | 10/2014 | Assuncao et al. |
| 2008/0097701 A1 | 4/2008 | Zawadzki et al. |
| 2008/0147417 A1 | 6/2008 | Freidberg |
| 2009/0319189 A1 | 12/2009 | Cornett et al. |
| 2010/0001997 A1* | 1/2010 | Kajikawa ............... G06T 15/20 345/419 |

(Continued)

FOREIGN PATENT DOCUMENTS

| | | |
|---|---|---|
| CN | 200947043 Y | 9/2007 |
| KR | 10-2014-0096831 | 8/2014 |

OTHER PUBLICATIONS

Liu et al., "A portable weather station design applied in the smart city", Advanced Materials Research, vols. 774-776, (Jun. 2013), pp. 1853-1858. Conf. Title: 2013 International Forum on Mechanical and Material Engineering.

(Continued)

*Primary Examiner* — Roy Y Yi
(74) *Attorney, Agent, or Firm* — Louis Percello

(57) ABSTRACT

One example of a computer-implemented method for adaptively placing weather sensors in response to dynamic local conditions includes obtaining a set of data indicating a dynamic local condition in a geographic location of interest and adaptively modifying a placement of a plurality of weather sensors in the geographic location of interest in response to the dynamic local condition.

20 Claims, 3 Drawing Sheets

(56) References Cited

U.S. PATENT DOCUMENTS

| | | |
|---|---|---|
| 2013/0085673 A1 | 4/2013 | Cavalcante et al. |
| 2013/0317749 A1 | 11/2013 | Borger et al. |
| 2014/0372039 A1 | 12/2014 | Leblanc |
| 2015/0035662 A1* | 2/2015 | Bowers .................. B60Q 9/008 340/436 |
| 2015/0206330 A1* | 7/2015 | Takechi .................. G01W 1/02 345/629 |

OTHER PUBLICATIONS

Moradkhani, Hamid, "Hydrologic Remote Sensing and Land Surface Data Assimilation", Portland State University, PDXScholar, Civil and Environmental Engineering Faculty Publications and Presentations, May 2008, pp. 2986-3004.

Lynch et al., "Decentralized Environmental Modeling by Mobile Sensor Networks", IEEE Robotics, pp. 1-15, Jun. 2008, vol. 24, Issue 3.

Kang et al, "Optimal placement of mobile sensors for data assimilations", Tellus, the International Meteorological institute in Stockholm, Oct. 2012, pp. 1-12.

SKYE Instruments Limited, Excerpt from the Datahog/Minimet Installation Manuel supplied with weather station, pp. 5, downloaded Jun. 2015 from www.skyinstrucments.com.

Straka et al., "A Mobile Mesonet for Finescale Meteorologia Observiation", Journal of Atmospheric and Oceanic Technology, vol. 13, No. 5, pp. 921-936, Oct. 1996.

* cited by examiner

ADAPTIVE PLACEMENT OF WEATHER SENSORS IN RESPONSE TO DYNAMIC LOCAL CONDITIONS

BACKGROUND

This disclosure relates generally to the field of numerical weather prediction, and relates more specifically to atmospheric data assimilation.

Numerical weather prediction (NWP) uses mathematical models of the atmosphere and oceans to predict the future weather based on current weather conditions. One important component of NWP is atmospheric data assimilation, which is a procedure that mathematically combines all of the available prior information (e.g., background, prediction models, observations, observation operators, error statistics, etc.) to obtain a state estimate (i.e., initial conditions and boundary conditions).

Some of this prior information is obtained from various types of sensors, such as surface weather stations and rain gauges, which are placed throughout a geographic area, in fixed locations. The greater the number of sensors that are placed in a given geographic area, the finer the resolution of the state estimate.

SUMMARY

A computer-implemented method for adaptively placing weather sensors in response to dynamic local conditions includes obtaining a set of data indicating a dynamic local condition in a geographic location of interest and adaptively modifying a placement of a plurality of weather sensors in the geographic location of interest in response to the dynamic local condition.

One example of a machine-readable storage medium encoded with instructions executable by a processor includes instructions for adaptively placing weather sensors in response to dynamic local conditions. The instructions more specifically include instructions to retrieve a set of data indicating a dynamic local condition in a geographic location of interest and instructions to adaptively modify a placement of a plurality of weather sensors in the geographic location of interest in response to the dynamic local condition.

One example of system for adaptively placing weather sensors in response to dynamic local conditions includes a processor for generating a modified placement of a plurality of weather sensors in a geographic location of interest, in response to a set of data indicating a dynamic local condition in a geographic location of interest and a set of placement models accessible by the processor, the set of placement models comprising at least one weighting model that assigns a weight to each different type of data in the set of data to generate a set of weights, and wherein the set of weights is associated with a recommended placement of the plurality of weather sensors.

BRIEF DESCRIPTION OF THE DRAWINGS

The teachings of the present disclosure can be readily understood by considering the following detailed description in conjunction with the accompanying drawings, in which.

DETAILED DESCRIPTION

In one example, the present disclosure is related to a computer-implemented method, non-transitory computer readable medium, and apparatus for adaptively placing weather sensors in response to dynamic local conditions, i.e., conditions that are temporary or subject to change. The resolution of a state estimate obtained via atmospheric data assimilation techniques is closely tied to the number of sensors that are placed throughout a given geographic area and to their spatial coverage. For instance, the greater the number of sensors, the finer the resolution. However, for large geographic areas such as large metropolitan cities, it may not be feasible (due to occupancy fees and maintenance and operation costs) to place more sensors, which are typically fixed in location, on a permanent basis.

One example of the present disclosure determines how to efficiently and adaptively place portable sensors within a geographic location of interest in order to obtain the best possible data for atmospheric data assimilation. Embodiments of the disclosure consider dynamic local conditions such as social, business, temporal, and/or ephemeral events or factors in order to adaptively reconfigure or modify a placement of sensors in the geographic location of interest. For example, if a special event is likely to draw a large number of attendees, the local authorities may wish to improve the resolution of short-term weather forecasts related to the location of the event. In this case, the number of sensors placed in and around the location of the event may be temporarily increased by relocating one or more portable sensors for a limited period of time.

Figure 1:
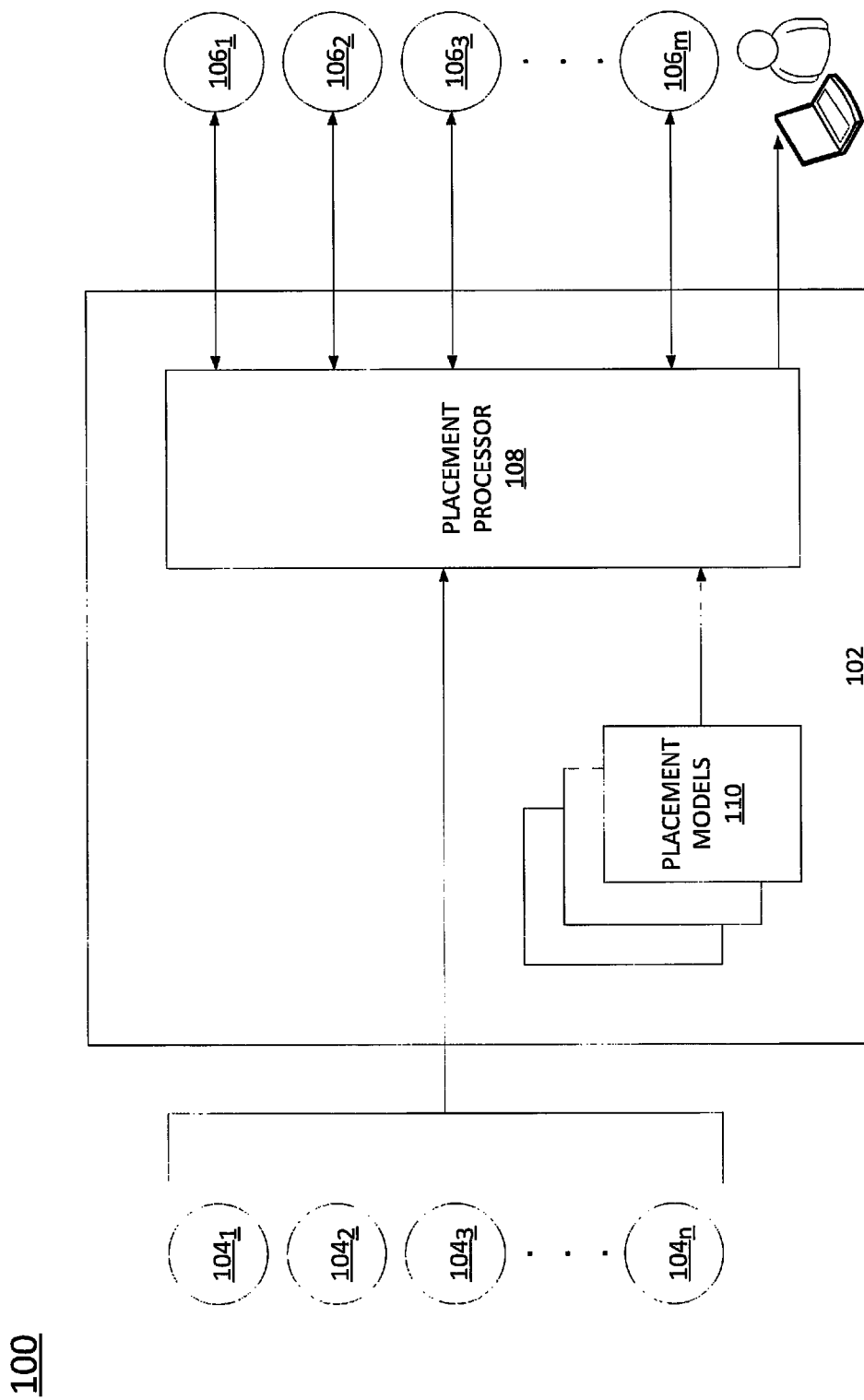
FIG. 1 illustrates a block diagram of one example of a system for adaptively placing weather sensors in response to dynamic local conditions.

FIG. 1 illustrates a block diagram of one example of a system 100 for adaptively placing weather sensors in response to dynamic local conditions. As illustrated, the system 100 generally comprises a placement system 102 in communication (e.g., over one or more networks) with a plurality of data sources $104_1$-$104_n$ (hereinafter collectively referred to as "data sources 104") and a plurality of sensors $106_1$-$106_n$ (hereinafter collectively referred to as "sensors 106").

The placement system 102 subscribes to the outputs of the data sources 104. The data sources 104 include sources of data that is relevant to a geographic area, and in a further embodiment include sources of data about dynamic conditions in the geographic area (e.g., social, business, temporal, and/or ephemeral factors). In one embodiment, the data provided by the data sources 104 includes one or more of the following types of data: meteorological data (e.g., previous weather forecasts, meteorological changes, large-scale weather models), event data (e.g., special events taking place in the geographic area, such as concerts, parades, or sporting events), demographic data (e.g., number of residents of or visitors to the geographic area), incident data (real-time and/or historical data relating to short-term dynamics such as rush hours, traffic accidents, etc.), agricultural data (e.g., seeding, harvesting, and/or cropping information), infrastructure data (e.g., location of infrastructure, severity or impact of events affecting infrastructure, etc.), and geodatabase data (e.g., geographic datasets such as maps, geographic coordinates, etc.). The data sources 104 may include public and/or private databases, social networks, weather sensors, or other sources of data. Data from the data sources 104 may be encrypted to address privacy concerns.

In addition, the placement system 102 may subscribe to the outputs of the sensors 106 (e.g., for real-time meteorological data). The sensors 106 comprise a plurality of weather sensors. In one embodiment, the sensors 106 include one or more of the following: weather stations, rain gauges, anemometers, humidity sensors, and temperature sensors. In one embodiment, at least one of the sensors 106 is portable, i.e., is not fixed relative to a single geographic location, and thus may be moved from one geographic location to another. For instance, a portable weather sensor may be mounted to an automobile, an unmanned vehicle, or other mobile support.

The placement system 102 generally comprises a placement processor 108 and a set of placement models 110. The placement processor 108 comprises, for example, a processing unit or computing device that receives the inputs from the data sources 104 and the sensors 106 and processes these inputs in accordance with one or more models in the set of placement models 110 to generate a placement scheme for the sensors 106.

The set of placement models 110 includes one or more models that generate recommended sensor placements (e.g., number and/or formation of sensors) for specific geographic locations based on dynamic local conditions in the specific geographic locations. For instance, the models may include weighting models that weight one or more factors relevant to a particular combination of dynamic local condition (e.g., concert, sporting event, car accident) and geographic location (e.g., Rio de Janeiro, Maracanã) in order to determine an optimal number of and formation of sensors to be placed in the geographic location.

The weighting model may, for example, assign weights to a variety of event- and/or location-related factors, including whether an event is considered to be permanent or temporary, estimated population density (e.g., attendance or human presence), estimated traffic weight (e.g., traffic generated as a result of the event), previous weather forecasts for the location of the event, and/or disaster susceptibility of the location of the event (e.g., frequency of natural disasters). The weights assigned to particular factors may comprise numerical ratings on a scale (e.g., from zero to ten, where zero is the lowest rating and ten is the highest rating), and the ratings of all of the factors may be considered in generating a recommended sensor placement for the location during and/or around the time of the event. The sensor placement may include a recommended number of sensors to be deployed and/or a recommended formation in which the sensors are to be arranged. Table 1, for example, illustrates an example weighting model that generates recommended sensor placements for a plurality of different types of events and different sets of associated weights.

TABLE 1

Example Weighting Model

| Event Type | Event Location | Perm./ Temp? | Pop. Density (0-10) | Traffic Weight (0-10) | Prior Forecast (0-10) | Disaster Suscept. (0-10) | Recc. Placement |
|---|---|---|---|---|---|---|---|
| Concert | Maracanã | T | 9 | 6 | 4 | 5 | 9 sensors, square |
| Soccer Match | Engenhão | T | 9 | 9 | 9 | 6 | 25 sensors, star |
| Strike | Praça da Bandeira | T | 10 | 10 | 2 | 7 | 25 sensors, square |
| Landslide | Maciço da Tijuca | P | 8 | 3 | 5 | 9 | 49 sensors, square |
| Landslide | Maciço da Tijuca | P | 8 | 3 | 9 | 9 | 100 sensors, square |
| Flood | Recreio | P | 5 | 4 | 4 | 5 | 17 sensors, star |
| Car Accident | Túnel Rebouças | T | 9 | 10 | 4 | 2 | 16 sensors, square |

It should be noted that the weighting model illustrated in Table 1 is only an example. Any weighting model used to balance different factors involved in determining a recommended placement of weather sensors may consider more or fewer factors than what is shown. For instance, some weighting models may not account for one or more of the factors listed in Table 1. In addition, some weighting models may account for factors that are not listed in Table 1.

Referring back to FIG. 1, the placement system 102 outputs one or more signals containing instructions for implementing the recommended sensor placement. The instructions may include, for example, identifications of specific sensors or types of sensors, specific geographic coordinates at which the sensors are to be deployed, and/or the durations of the deployments. In one example, the placement processor 102 sends these signals (e.g., over one or more networks) directly to the sensors 106 to be deployed. In another example, the placement processor 102 sends these signals to one or more human operators who are responsible for placing the sensors 106.

Alternative configurations of the system 100 are possible. For instance, in one example, the placement models 110 may be accessed remotely (e.g., over one of more networks) by the placement processor 108.

Figure 2:
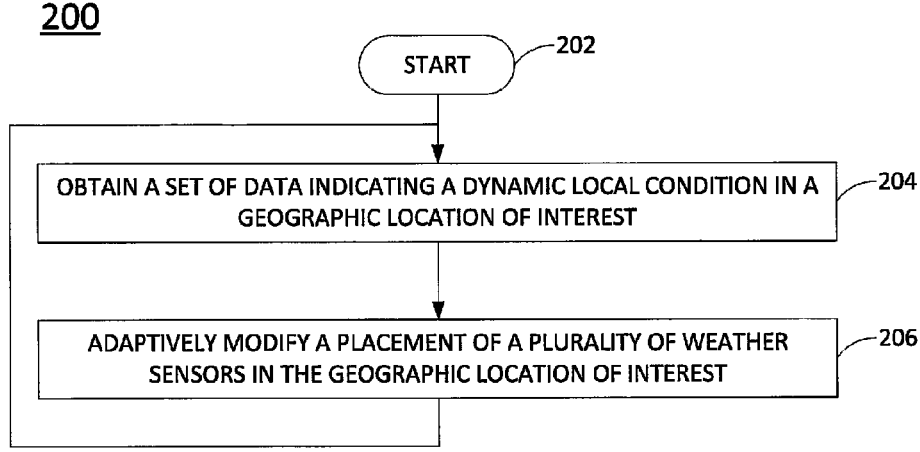
FIG. 2 is a flow diagram illustrating one example of a high level computer-implemented method for adaptively placing weather sensors in response to dynamic local conditions.

FIG. 2 is a flow diagram illustrating one example of a high level computer-implemented method 200 for adaptively placing weather sensors in response to dynamic local conditions. The method 200 may be carried out, for example, by various components of the placement system 102 illustrated in FIG. 1 and described in detail above, or by a general purpose computer that is programmed to function as special purpose computer, as discussed below in connection with FIG. 4. As an example, the method 200 is described as being performed by components of the placement system 102.

The method 200 begins in step 202. In step 204, the placement system 102 obtains a set of data indicating a dynamic local condition in a geographic location of interest. The set of data be may obtained, for example, from the data sources 104. In one embodiment, the placement system 102 continuously listens to or monitors the data sources 104 for updates. The set of data may include, for example, data about social, temporal, and/or ephemeral factors or events related to the geographic location of interest. In one embodiment, the set of data includes one or more of the following types of data: meteorological data (e.g., previous weather forecasts, meteorological changes, large-scale weather models), event data (e.g., special events taking place in the geographic area, such as concerts, parades, or sporting events), demographic data (e.g., of residents of or visitors to the geographic area), incident data (real-time and/or historical data relating to short-term dynamics such as rush hours, traffic accidents, etc.), agricultural data (e.g., seeding, harvesting, and/or cropping information), infrastructure data (e.g., location of infrastructure, severity or impact of events affecting infrastructure, etc.), and geodatabase data (e.g., geographic datasets such as maps, geographic coordinates, etc.). In one embodiment, the set of data is transmitted from the data sources 104 to the placement system 102 via a network (e.g., pushed to or pulled by the placement system 102). The set of data may be transmitted periodically (e.g., every x seconds), on-demand (e.g., in response to a request from the placement system 102), or automatically (e.g., as the data becomes available).

In step 206, the placement processor 108 adaptively modifies a placement of a plurality of weather sensors in the geographic location of interest, in response to the dynamic local condition. The modified placement may include a specific formation or arrangement of the weather sensors (e.g., square pattern, star pattern, etc.) as well as an increase or decrease in the number of weather sensors to be deployed.

The method 200 then returns to step 204 and awaits the receipt of a new set of data.

Figure 3:
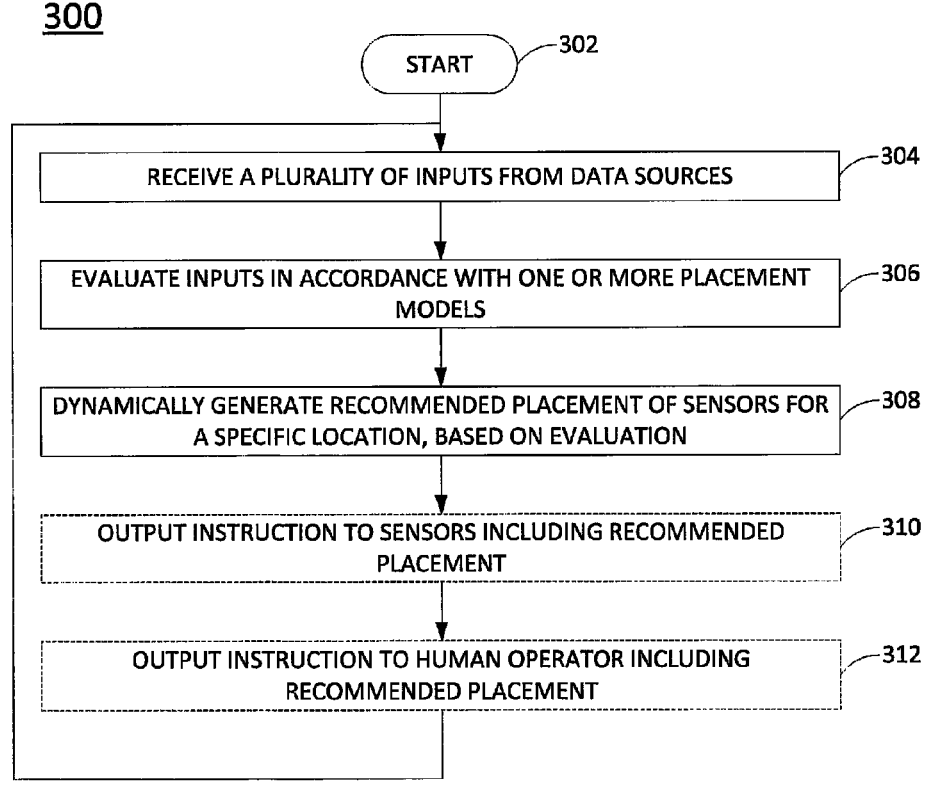
FIG. 3 is a flow diagram illustrating one example of a more detailed computer-implemented method for adaptively placing weather sensors in response to dynamic local conditions.

FIG. 3 is a flow diagram illustrating one example of a more detailed computer-implemented method 300 for adaptively placing weather sensors in response to dynamic local conditions. The method 300 may be carried out, for example, by various components of the placement system 102 illustrated in FIG. 1 and described in detail above, or by a general purpose computer that is programmed to function as special purpose computer, as discussed below in connection with FIG. 4. As an example, the method 300 is described as being performed by components of the placement system 102.

The method 300 begins in step 302. In step 304, the placement system 102 receives a plurality of inputs from the data sources 104. In one embodiment, the placement system 102 continuously listens to or monitors the data sources 104 for updates. The plurality of inputs may include, for example, data about dynamic conditions in a given geographic area (e.g., social, temporal, and/or ephemeral factors). In one embodiment, the data provided by the data sources 104 includes one or more of the following types of data: meteorological data (e.g., previous weather forecasts, meteorological changes, large-scale weather models), event data (e.g., special events taking place in the geographic area, such as concerts, parades, or sporting events), demographic data (e.g., of residents of or visitors to the geographic area), incident data (real-time and/or historical data relating to short-term dynamics such as rush hours, traffic accidents, etc.), agricultural data (e.g., seeding, harvesting, and/or cropping information), infrastructure data (e.g., location of infrastructure, severity or impact of events affecting infrastructure, etc.), and geodatabase data (e.g., geographic datasets such as maps, geographic coordinates, etc.). In one embodiment, the data is transmitted from the data sources 104 to the placement system 102 via a network (e.g., pushed to or pulled by the placement system 102). The data may be transmitted periodically (e.g., every x seconds), on-demand (e.g., in response to a request from the placement system 102), or automatically (e.g., as the data becomes available).

In step 306, the placement processor 108 evaluates the data in accordance with one or more of the placement models 110. In one embodiment, evaluating of the data in step 306 may involve inputting some of the data into the placement models, e.g., into different weighted fields of a weighting model. For instance, using the example weighting model illustrated in Table 1, inputting the data may involve inputting an event type, whether the event is temporary or permanent, the population density of the location at which the event is occurring, the traffic weight of the location at which the event is occurring, previous weather forecasts for the location at which the event is occurring, and/or the disaster susceptibility of the location at which the event is occurring.

Once the data has been evaluated in accordance with the one or more of the placement models 110, the method 300 proceeds to step 308, where the placement processor 102 dynamically generates a recommended placement of sensors for a specific location. As discussed above, the recommended placement may include a specific formation or arrangement of the sensors (e.g., square pattern, star pattern, etc.) as well as the number of sensors to be deployed. Using Table 1 as an example, a landslide occurring in an area with a high population density like Maciçco da Tijuca would be prioritized relatively highly (e.g., in terms of number of portable sensors deployed); the recommended placement in this case might involve deploying one hundred sensors to Maciço da Tijuca in a square formation. The temporary deployment of a greater number of sensors would improve the quality and amount of information available for atmospheric data assimilation. This, in turn, would improve the quality of information provided to decision makers tasked with responding to the situation (e.g., in the case of a landslide, does the event warrant raising an alarm, evacuating people, initiating civil defense actions, etc.?).

In optional step 310 (illustrated in phantom), the placement system 102 outputs an instruction directly to one or more of the sensors 106. The instruction specifies a location (e.g., geographic coordinates) to which a sensor 106 is to be deployed and is based on the recommended placement generated in step 308.

In optional step 312 (illustrated in phantom), the placement system 102 outputs an instruction to a human operator. The instruction identifies one or more sensors 106 to be placed by the human operator, as well as the location (e.g., geographic coordinates) to which each sensor is to be deployed.

Once any necessary instructions have been sent to the sensors 106 and/or human operators, the method 300 returns to step 304 and awaits the receipt of new data from the data sources 304.

Once the sensors 106 have been deployed in the recommended number and formation, they can communicate with a data assimilation and/or NWP tool to provide high-resolution data for improved weather forecasting. The improved weather forecasting, in turn, can improve the planning of events, business operations, disaster or emergency response operations, and other tasks.

Thus, the system 100 and methods 200 and 300 may operate in conjunction to temporarily improve the quality of information available for atmospheric data assimilation for a particular location. In turn, this will improve the quality of short-term weather forecasts that may affect dynamic conditions in the particular location.

For instance, authorities in Rio de Janeiro may decide to improve the weather forecasts (e.g., increase the resolution of the forecasts) in the city during and around the time of a concert. This may involve deploying a number of extra weather sensors in the city in a particular pattern in order to provide additional data for atmospheric data assimilation. Improved atmospheric data assimilation will yield improved NWP results, and can also potentially yield improved short-range forecast information for concert attendees.

Alternatively, city authorities in Maracanãmay wish to obtain improved information on weather, rain, and/or other possible factors that may impact a scheduled sporting event. The improved information may help the authorities to better manage traffic and support staffing.

As another example, embodiments of the present disclosure may be deployed to improve business-centric operations, such as the maintenance of power grid assets, the maintenance of an oil refinery, agricultural operations, etc.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Examples of the present disclosure may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
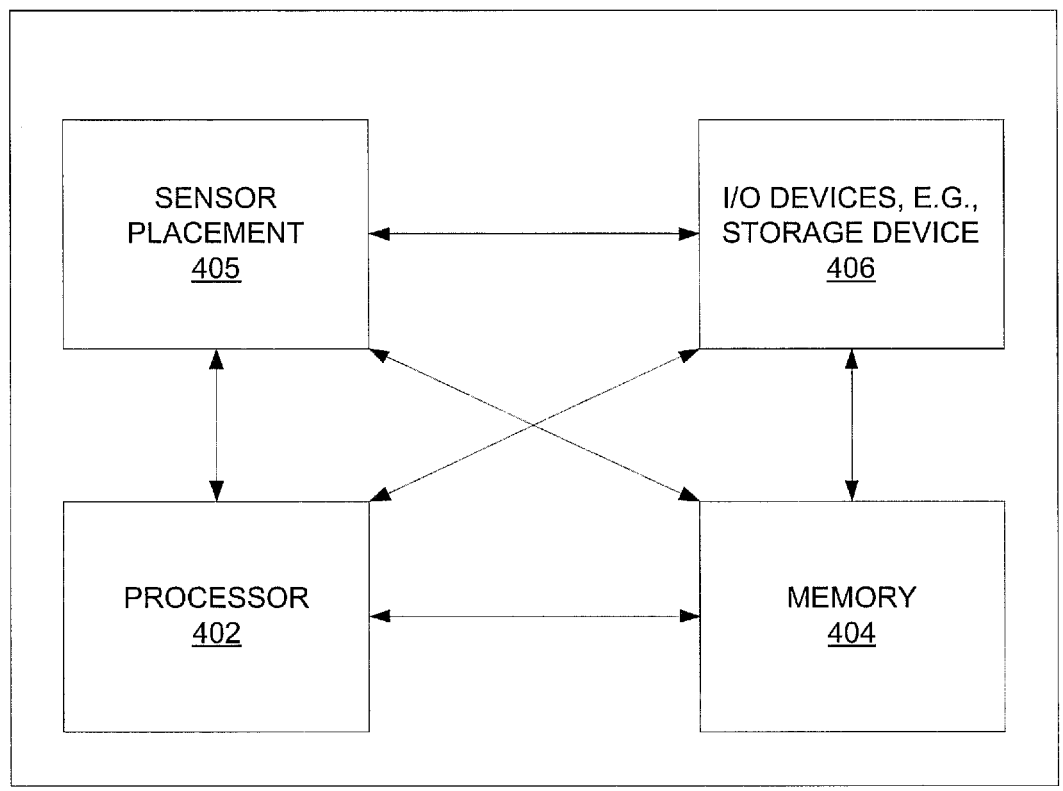
FIG. 4 depicts a high-level block diagram of a computer that can be transformed into a machine capable of performing the functions described herein.

FIG. 4, for example, depicts a high-level block diagram of a computer 400 that can be transformed into a machine capable of performing the functions described herein. The computer 400 may comprise, for example, part of the placement system 102 discussed above in connection with FIG. 1. Notably, no computer or machine currently exists that performs the functions as described herein. As a result, the examples of the present disclosure improve the operation and functioning of the general-purpose computer to adaptively placing weather sensors in response to dynamic local conditions, as disclosed herein.

As depicted in FIG. 4, the computer or system 400 comprises a hardware processor element 402 (e.g., a central processing unit (CPU), a microprocessor, or a multi-core processor), a memory 404, e.g., random access memory (RAM) and/or read only memory (ROM), a module 405 for adaptively placing weather sensors in response to dynamic local conditions, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the respective systems and/or methods discussed above can be used to configure a hardware processor to perform the steps functions and/or operations of the above disclosed systems and methods. In one embodiment, instructions and data for the present module or process 405 for adaptively placing weather sensors in response to dynamic local conditions (e.g., a software program comprising computer-executable instructions) can be loaded into memory 304 and executed by hardware processor element 402 to implement the steps, functions or operations as discussed above in connection with the exemplary system 100 and/or methods 200 and 300. The processor executing the computer readable or software instructions relating to the above described method(s) can be perceived as a programmed processor or a specialized processor. As such, the present module 405 for adaptively placing weather sensors in response to dynamic local conditions (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
obtaining a set of data indicating a dynamic local condition in a geographic location of interest; and
adaptively changing a number of hardware weather sensors placed within the geographic location of interest in response to the dynamic local condition to improve a resolution of a short-term weather forecast from the geographic location interest.
2. The computer-implemented method of claim 1, wherein the dynamic local condition comprises a social, temporal, or ephemeral event.
3. The computer-implemented method of claim 2, wherein the social, temporal, or ephemeral event is a concert.
4. The computer-implemented method of claim 2, wherein the social, temporal, or ephemeral event is a sporting event.
5. The computer-implemented method of claim 2, wherein the social, temporal, or ephemeral event is an emergency event.
6. The computer-implemented method of claim 1, wherein the adaptively changing the number of hardware weather sensors comprises:
evaluating the set of data in accordance with a placement model that generates a recommended number of hard- ware weather sensors based on a combination of the dynamic local condition and the geographic location of interest.

7. The computer-implemented method of claim 6, wherein the placement model comprises a weighting model that assigns a weight to each different type of data in the set of data to generate a set of weights, and wherein the set of weights is associated with the recommended number of hardware weather sensors.

8. The computer-implemented method of claim 6, wherein the set of data includes event data for the geographic location of interest.

9. The computer-implemented method of claim 6, wherein the set of data includes incident data for the geographic location of interest.

10. The computer-implemented method of claim 6, wherein the set of data includes agricultural data for the geographic location of interest.

11. The computer-implemented method of claim 6, wherein the set of data includes infrastructure data for the geographic location of interest.

12. The computer-implemented method of claim 6, wherein the set of data includes geodatabase data for the geographic location of interest.

13. The computer-implemented method of claim 1, further comprising:
adaptively arranging the number of hardware weather sensors in a formation that is selected based on the set of data and on the geographic location of interest.

14. The computer-implemented method of claim 1, wherein the adaptively changing the number of hardware weather sensors comprises:
sending an instruction to at least one sensor of the number of hardware weather sensors specifying a location to which the at least one sensor is to be deployed.

15. The computer-implemented method of claim 1, wherein the adaptively changing the number of hardware weather sensors comprises:
sending an instruction to a human operator specifying a location to which at least one sensor of the number of hardware weather sensors is to be deployed.

16. A machine-readable storage medium encoded with instructions executable by a processor, the machine-readable storage medium comprising:
instructions to retrieve a set of data indicating a dynamic local condition in a geographic location of interest; and
instructions to change a number of hardware weather sensors placed within the geographic location of interest in response to the dynamic local condition to improve a resolution of a short-term weather forecast from the geographic location of interest.

17. A system, comprising:
a processor for determining a change in a number of hardware weather sensors to be placed within a geographic location of interest, in response to a set of data indicating a dynamic local condition in the geographic location of interest, to improve a resolution of a short-term weather forecast from the geographic location of interest; and
a set of placement models accessible by the processor, the set of placement models comprising at least one weighting model that assigns a weight to each different type of data in the set of data to generate a set of weights, and wherein the set of weights is associated with a recommended number and arrangement of hardware weather sensors.

18. The system of claim 17, wherein the processor specifies a location within the geographic location of interest to which at least one sensor of the number of hardware weather sensors is to be deployed.

19. The method of claim 1, wherein the number of hardware weather sensors is changed by relocating a portable weather sensor into the geographic location of interest.

20. The method of claim 1, wherein the number of hardware weather sensors is changed by relocating a portable weather sensor out of the geographic location of interest.

* * * * *